(12) United States Patent
Yang

(10) Patent No.: US 9,013,230 B2
(45) Date of Patent: Apr. 21, 2015

(54) CHARGE PUMP CIRCUIT

(71) Applicant: Shanghai Huahong Grace Semiconductor Manufacturing Corporation, Shanghai (CN)

(72) Inventor: Guangjun Yang, Shanghai (CN)

(73) Assignee: Shanghai Huahong Grace Semiconductor Manufacturing Corporation, Shanghai (CN)

( * ) Notice: Subject to any disclaimer, the term of this patent is extended or adjusted under 35 U.S.C. 154(b) by 29 days.

(21) Appl. No.: 13/964,754

(22) Filed: Aug. 12, 2013

(65) Prior Publication Data

US 2014/0152378 A1 Jun. 5, 2014

(30) Foreign Application Priority Data

Nov. 30, 2012 (CN) .......................... 2012 1 0507627

(51) Int. Cl.
*G05F 1/10* (2006.01)
*G05F 3/02* (2006.01)
*H02M 3/07* (2006.01)

(52) U.S. Cl.
CPC ...................... *H02M 3/07* (2013.01)

(58) Field of Classification Search
USPC ....................................... 327/536; 363/59–60
See application file for complete search history.

(56) References Cited

U.S. PATENT DOCUMENTS

| 5,436,821 | A  | * | 7/1995  | Inoue .............................. 363/60 |
| 6,456,154 | B2 | * | 9/2002  | Sugimura ...................... 327/537 |
| 8,022,749 | B2 | * | 9/2011  | Schatzberger et al. ....... 327/536 |
| 8,035,440 | B2 | * | 10/2011 | Hernandez-Garduno et al. ............................. 327/536 |
| 2007/0035973 | A1 | * | 2/2007 | Kitazaki et al. ................. 363/59 |
| 2009/0184753 | A1 | * | 7/2009 | Kawashima et al. ......... 327/536 |
| 2013/0069711 | A1 | * | 3/2013 | Chen ............................. 327/536 |

* cited by examiner

Primary Examiner — Quan Tra
(74) Attorney, Agent, or Firm — Muncy, Geissler, Olds & Lowe, P.C.

(57) ABSTRACT

A charge pump circuit includes a charge pump, a regulator circuit, and a load current, wherein the charge pump circuit further includes: a filter circuit connected to an output terminal of the charge pump for filtering an output voltage of the charge pump; and a ripple control circuit connected both to the output terminal of the charge pump and to the filter circuit for reducing the output voltage of the charge pump upon an increase thereof, thereby attenuating ripples contained in the output voltage of the charge pump. The charge pump circuit is capable of enabling a relatively stable output voltage for the charge pump, thus benefiting a downstream integrated circuit.

5 Claims, 2 Drawing Sheets

CHARGE PUMP CIRCUIT

CROSS-REFERENCES TO RELATED APPLICATIONS

This application claims the priority of Chinese patent application number 201210507627.7, filed on Nov. 30, 2012, the entire contents of which are incorporated herein by reference.

TECHNICAL FIELD

The present invention relates in general to charge pump circuits, and more particularly to a charge pump circuit for use in non-volatile memory.

BACKGROUND

Charge pump is a kind of capacitive voltage converter which can be used to raise or lower a voltage, or even be used to generate a negative voltage. As charge pump circuits are capable of high efficiencies while being electrically simple circuits, they have been widely used in single-supply-powered integrated circuits, such as electrically erasable programmable read-only memories (EEPROM's) and flash memories. A charge pump can increase a power supply voltage and thereby converts it to a high-voltage signal for driving a load or supporting read and write operations of an EEPROM or a flash memory.

FIG. 1 schematically illustrates a common charge pump circuit of the prior art. The charge pump circuit includes a charge pump 101, a regulator circuit 102, a capacitor C1 and a load current I1. FIG. 2 shows a schematic diagram showing a waveform output from the charge pump circuit of FIG. 1. It can be seen from FIG. 2 that, as the charge pump circuit of FIG. 1 only applies some simple filtering to an output voltage of the charge pump 101 and is lack of ripple control, there are great ripples in the output waveform. Therefore, the charge pump circuit cannot output a relatively stable voltage, thus being unfavorable for a downstream integrated circuit.

SUMMARY OF THE INVENTION

The main objective of the present invention is to provide a charge pump circuit to address the lack of ripple control of the prior art charge pump circuit, which applies ripple control to an output of a charge pump, thereby enabling a relatively stable output voltage for the charge pump and benefiting a downstream integrated circuit.

To achieve the above objectives, there is provided a charge pump circuit including a charge pump, a regulator circuit, and a load current, wherein the charge pump circuit further includes: a filter circuit connected to an output terminal of the charge pump for filtering an output voltage of the charge pump; and a ripple control circuit connected both to the output terminal of the charge pump and to the filter circuit for reducing the output voltage of the charge pump upon an increase thereof, thereby attenuating ripples contained in the output voltage of the charge pump.

Further, the filter circuit may include a capacitor, a first NMOS and a resistor, the first NMOS including a first gate, a first drain and a first source, the capacitor having one end connected to the output terminal of the charge pump and the other end connected to the first drain, the first gate and the first drain being interconnected to each other and both connected to the ripple control circuit, the first source connected to a ground via the resistor.

Further, the ripple control circuit may include a second NMOS, a third NMOS and a fourth NMOS. The second NMOS having a second gate connected to the filter circuit, a second source connected to the ground and a second drain connected to the third NMOS, the third NMOS having a third gate connected to a power supply voltage and a third drain connected to a fourth source of the fourth NMOS, the fourth NMOS having a fourth gate and a fourth drain interconnected to each other and both connected to the output terminal of the charge pump.

Further, the gate of the second gate of the second NMOS may be connected to both the first gate and the first drain of the first NMOS, and wherein the second NMOS has a threshold voltage higher than a threshold voltage of the first NMOS.

Further, the regulator circuit may be connected to the output terminal of the charge pump.

Further, the load current may be connected to the output terminal of the charge pump.

Compared to the prior art charge pump circuit, adding the ripple control circuit to the output terminal of the charge pump to reduce an output voltage of the charge pump upon its increase enables the charge pump circuit of the present invention to control ripple amplitude. This ensures a relatively stable output voltage for the charge pump, thus benefiting a downstream integrated circuit.

DETAILED DESCRIPTION

To further describe the present invention, reference is made to the following detailed description on exemplary embodiments, taken in conjunction with the accompanying drawings. Other advantages and beneficial effects of the invention will become readily apparent to those skilled in the art upon reading the following description. The invention may be embodied in many different forms from the exemplary ones and various modifications and variations can be made to details of the exemplary ones without departing from the present teachings.

Figure 1:
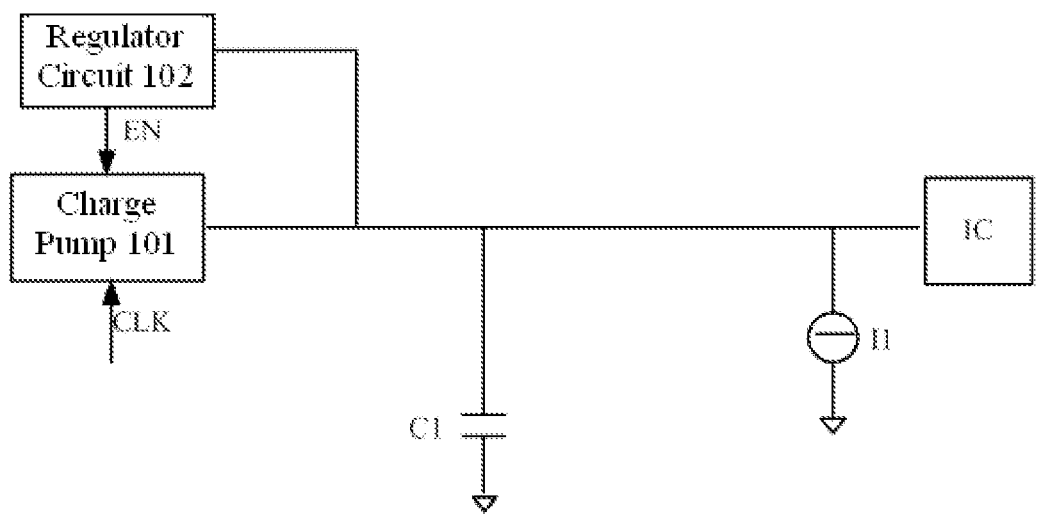
FIG. 1 shows a schematic circuit diagram of a common charge pump circuit of the prior art.
Figure 2:
FIG. 2 schematically illustrates a waveform output from the charge pump circuit of FIG. 1.
Figure 3:
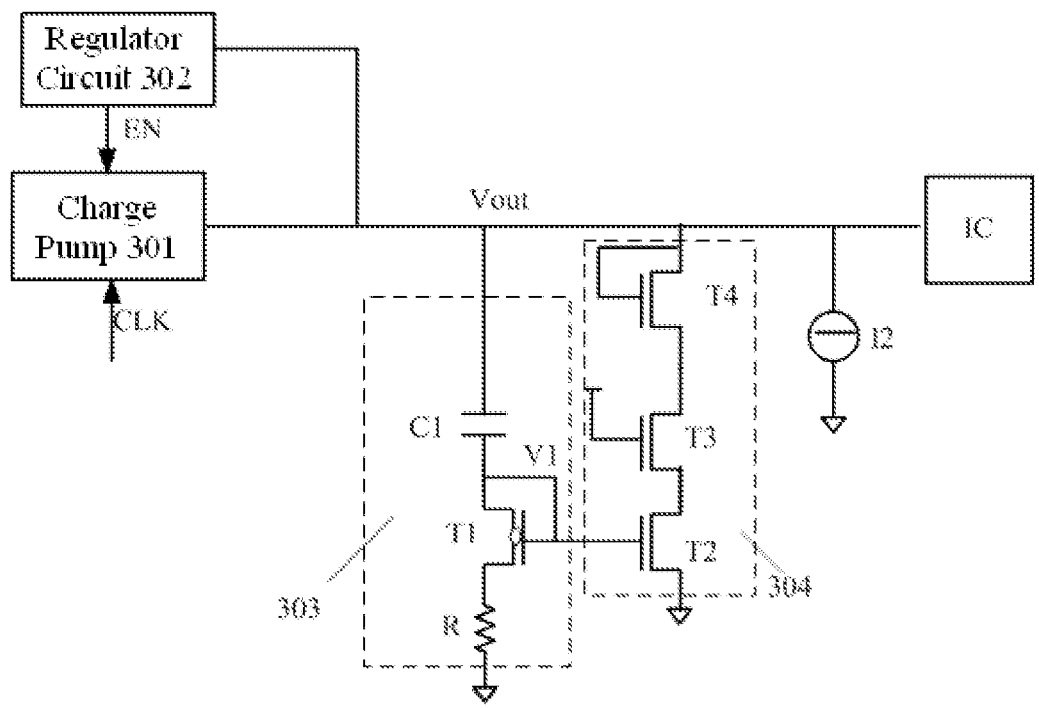
FIG. 3 shows a schematic circuit diagram of a charge pump circuit in accordance with a preferred embodiment of the present invention.

FIG. 3 schematically illustrates a charge pump circuit in accordance with a preferred embodiment of the present invention. The charge pump circuit includes a charge pump 301, a regulator circuit 302, a filter circuit 303, a ripple control circuit 304 and a load current I2.

The charge pump 301 is configured to output a voltage Vout under the control of a clock signal CLK and an enable signal EN. The regulator circuit 302 is connected to an output terminal of the charge pump 301 and is provided to output the enable signal EN for regulating the charge pump 301. The filter circuit 303 is also connected to the output terminal of the charge pump 301 and is provided to filter an output voltage of the charge pump 301. The ripple control circuit 304 is connected both to the output terminal of the charge pump 301 and to the filter circuit 303 and is provided to reduce the output voltage Vout of the charge pump 301 upon its increase so as to attenuate ripples contained therein.

In the illustrated preferred embodiment, the filter circuit 303 may include a capacitor C1, a first NMOS T1 and a resistor R. One end of the capacitor C1 is connected to the output terminal of the charge pump 301 and the other end is connected to a drain of the first NMOS T1. The drain and a gate of the first NMOS T1 are interconnected to each other and both connected to the ripple control circuit 304, and a source of the first NMOS T1 is connected to a ground via the resistor R. Moreover, the ripple control circuit 304 may include a second NMOS T2, a third NMOS T3 and a fourth NMOS T4. The second NMOS T2 has a gate connected to the filter circuit 303 (i.e., connected to both the gate and the drain of the first NMOS T1 of the filter circuit 303), a source connected to the ground and a drain connected to a source of the third NMOS T3. The third NMOS T3 has a gate connected to a power supply voltage and a drain connected to a source of the fourth NMOS T4. The fourth NMOS T4 has a gate and a drain interconnected to each other and both connected to the output terminal of the charge pump 301. Furthermore, the second NMOS T2 may have a threshold voltage higher than that of the first NMOS T1.

Figure 4:
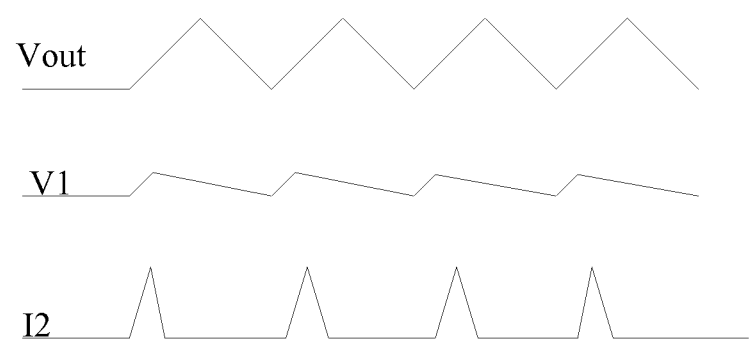
FIG. 4 schematically illustrates a waveform output from the charge pump circuit in accordance with the preferred embodiment of the present invention.

The preferred embodiment will be further described below with reference to FIG. 4, which is a schematic diagram of a waveform output from the charge pump circuit of the preferred embodiment. The output ripple voltage is coupled to the first NMOS T1 via the capacitor C1. Great ripple amplitude will lead to a high associated coupling voltage V1 which will turn on the first NMOS T1 and thus be grounded thereby. This can reduce the ripple amplitude to a certain extent. Moreover, a greater ripple amplitude will lead to a higher coupling voltage V1, and when the higher coupling voltage V1 reaches a threshold voltage VT2 of the second NMOS T2, the second NMOS T2, as well as the downstream two load transistors, i.e., the third and fourth NMOS T3, T4, will also be turned on. This will reduce the output voltage Vout and the ripple amplitude. Regardless, as the threshold voltage of the second NMOS T2 is higher than the threshold voltage of the first NMOS T1, the second NMOS T2 will not be turned on when there is no ripple in the output voltage and will hence not cause direct current power consumption.

As indicated above, adding the ripple control circuit to the output terminal of the charge pump to reduce an output voltage of the charge pump upon its increase enables the charge pump circuit of the present invention to control ripple amplitude. This ensures a relatively stable output voltage for the charge pump, thus benefiting a downstream integrated circuit.

The specific embodiments disclosed above are solely some examples for describing the principles and beneficial effects of the present invention and are not intended to limit the invention in any way. Those skilled in the art can make various modifications and variations without departing from the scope of the invention. Thus, it is intended that the scope of the present invention is as defined in the appended claims.

What is claimed is:

1. A charge pump circuit, comprising a charge pump, a regulator circuit, and a load current, wherein the charge pump circuit further comprises:
a filter circuit connected to an output terminal of the charge pump for filtering an output voltage of the charge pump; and
a ripple control circuit connected both to the output terminal of the charge pump and to the filter circuit for reducing the output voltage of the charge pump upon an increase thereof, thereby attenuating ripples contained in the output voltage of the charge pump;
wherein the filter circuit includes a capacitor, a first NMOS and a resistor, the first NMOS including a first gate, a first drain and a first source, the capacitor having one end connected to the output terminal of the charge pump and the other end connected to the first drain, the first gate and the first drain being interconnected to each other and both connected to the ripple control circuit, the first source connected to ground via the resistor.

2. The charge pump circuit according to claim 1, wherein the ripple control circuit includes a second NMOS, a third NMOS and a fourth NMOS, the second NMOS having a second gate connected to the filter circuit, a second source connected to the ground and a second drain connected to the third NMOS, the third NMOS having a third gate connected to a power supply voltage and a third drain connected to a fourth source of the fourth NMOS, the fourth NMOS having a fourth gate and a fourth drain interconnected to each other and both connected to the output terminal of the charge pump.

3. The charge pump circuit according to claim 2, wherein the second gate of the second NMOS is connected to both the first gate and the first drain of the first NMOS, and wherein the second NMOS has a threshold voltage higher than a threshold voltage of the first NMOS.

4. The charge pump circuit according to claim 1, wherein the regulator circuit is connected to the output terminal of the charge pump.

5. The charge pump circuit according to claim 1, wherein the load current is connected to the output terminal of the charge pump.

* * * * *